United States Patent

[11] 3,548,727

[72] Inventor: Yoshihisa Maitani
 Tokyo, Japan
[21] Appl. No.: 834,216
[22] Filed: June 9, 1969
 Continuation-in-part of Ser. No. 528,504,
 Feb. 18, 1966 abandoned.
[45] Patented: Dec. 22, 1970
[73] Assignee: Olympus Optical Co. Ltd
 Tokyo, Japan
[32] Priority: Feb. 27, 1965, Oct. 16, 1965, Oct. 16, 1965
[33] Japan
[31] 40/11,470, 40/63,431, and 40/63,432

[54] DEVICE FOR DETERMINING AND SETTING THE PROPER EXPOSURE FOR A CAMERA
4 Claims, 5 Drawing Figs.
[52] U.S. Cl. ..................................................... 95/10,
 95/42, 95/64
[51] Int. Cl. ..................................................... G03b 7/06,
 G03b 9/00
[50] Field of Search ........................................... 95/10C, 42, 64

[56] References Cited
UNITED STATES PATENTS

| | | | |
|---|---|---|---|
| 2,929,308 | 3/1960 | Swarofsky | 95/64 |
| 3,018,706 | 1/1962 | Remtschler | 95/64X |
| 3,071,054 | 1/1963 | Singer | 95/10(C) |
| 3,073,222 | 1/1963 | Broschke | 95/10(C) |
| 3,079,848 | 3/1963 | Rentschler | 95/10(C) |
| 3,082,672 | 3/1963 | Swarofsky et al. | 95/10(C) |
| 3,094,053 | 6/1963 | Lieser | 95/10(C) |
| 3,262,380 | 7/1966 | Winkler | 95/10(C) |

FOREIGN PATENTS

| | | | |
|---|---|---|---|
| 1,296,960 | 1962 | France | 95/10(C) |

Primary Examiner—John M. Horan
Assistant Examiner—Joseph F. Peters, Jr.
Attorney—Wenderoth, Lind & Ponack ABSTRACT: A device for determining and manually setting the proper exposure for the cameras using selectively interchangeable objective lenses of different characteristics. A common series of reference symbols is provided on each of the preset diaphragm regulating rings associated with each different objective lens, while also utilizing the same series of reference symbols for the light exposure meter scale. The diaphragm opening is regulated by manually aligning a selected one of the series of reference symbols of the regulating rings with a reference index point provided on each of the objective lenses, with each of the objective lenses mounted on the camera without any mechanical coupling between the diaphragm regulating ring and the exposure meter. The series of reference symbols are so placed relative to one another in predetermined spacing and displaced from their theoretical positions to compensate for the difference in the respective focal lengths as well as the difference in the intensity of the light in peripheral zones of the lenses due to optical interference caused by elements in the lenses. The symbols commencing with those respectively succeeding the first one designate the maximum diaphragm opening for the selected lens, so that when lined up with the aforesaid reference index, the indicated diaphragm opening is one-half of that indicated by the adjacent preceding reference symbol. The respective succeeding reference symbols of the light exposure scale indicate the light intensity as being twice that of the preceding symbol, whereby the proper exposure is achieved by the stated aligning of a given reference symbol of the objective lens' diaphragm regulating ring which corresponds to the same reference symbol to which the pointer of the exposure meter is directed, with the reference index of that objective lens.

Fig. 4

| F | 1.2 | 1.4 | 1.8 | 2 | 2.8 | 3.5 | 4 | 5.6 | 8 | 11 | 16 | 22 |
|---|---|---|---|---|---|---|---|---|---|---|---|---|
| 1:1.2 ± 42mm | a | | | | b | c | d | e | f | g | | |
| 1:1.4 ± 40 | | a | | | b | c | d | | e | f | g | |
| 1:1.8 ± 38 | | | a | | b | c | d | e | | f | g | |
| 1:3.5 ± 50~90 Z | | | | | | b | | c | d | e | f | |
| 1:3.5 ± 100 T | | | | | | b | | c | d | e | f | g |
| 1:4 ± 150 T | | | | | b | | c | | d | e | f | g |
| 1:4 ± 25 W | | | | | | a | | b | c | d | e | |

Fig. 5

| F | 1.2 | 1.4 | 1.8 | 2 | 2.8 | 3.5 | 4 | 5.6 | 8 | 11 | 16 | 22 |
|---|---|---|---|---|---|---|---|---|---|---|---|---|
| 1:1.8  f 38 | | a | | | b | c | | d | e | f | g | |
| 1:3.5 ± 50~90 Z | | | | | | b | | c | d | e | f | |
| 1:3.5 ± 100 T | | | | | | b | | c | d | e | f | g |
| 1:4 ± 150 T | | | | | b | | c | | d | e | f | g |

DEVICE FOR DETERMINING AND SETTING THE PROPER EXPOSURE FOR A CAMERA

This application is a continuation-in-part application of U.S. Pat. application Ser. No. 528,504 filed by the same applicant on Feb. 18, 1966, and now abandoned.

BACKGROUND OF THE INVENTION

The present invention relates to a device for determining and setting the proper exposure for a camera by measuring the intensity of the light transmitted through an interchangeable lens selectively mounted on the camera.

In a camera for use with several interchangeable objective lenses, the intensity of the light transmitted through an interchangeable objective lens selectively mounted on the camera has heretofore been measured by means of an exposure meter built into the camera body, thereby determining the proper exposure for the camera in accordance with the indication given by the meter. In such a case, the maximum lens aperture, i.e. the F-value of each of the interchangeable objective lenses in their fully opened conditions, is not always the same; that is, some of the lenses may have an F-value of F2, the others may have an F-value of F2.8 or F4, or, further, may have an F-value of F3.5, etc.

An exposure meter generally should receive the light from the scene to be photographed without any interference occurring between the scene and the exposure meter. However, as mentioned above, when an interchangeable objective lens is selectively mounted on the camera which may have a different maximum lens aperture from another such lens and the light transmitted through said lens is to be measured for determining the proper exposure, the intensity of the light transmitted through the lens may vary depending upon the maximum lens aperture, i.e. the F-value of the fully opened diaphragm opening of the selected interchangeable objective lens. Therefore, the indication given by the pointer of the exposure meter may vary depending upon the selected interchangeable objective lens and its maximum lens aperture, thus making it impossible to determine the proper exposure by merely accepting the indication on the exposure meter of the light transmitted through the lens.

In order to make it possible to determine the proper exposure for a camera by measuring the light transmitted through the selected lens having a different maximum lens aperture than some other lens, it is necessary to compensate for the difference in the indication given by the pointer of the exposure meter due to the difference in F-value of the fully opened diaphragm opening of the lens mounted on the camera.

In the prior art, as a measure for compensating for such a difference in indication given by the exposure meter, the light intensity has been measured by the exposure meter after adjusting the interchangeable lens mounted on the camera so that a predetermined F-value of the diaphragm opening is effected. However, such a measure is very troublesome, because it is necessary to actuate diaphragm regulating means prior to the measurement of the light intensity, and, further, an erroneous measurement might be obtained if the operator overlooks adjusting the diaphragm regulating means prior to the measurement.

As a further measure for compensating for the difference in the indication given by the exposure meter, there has been provided a special compensating device adjacent to the position in the camera where the interchangeable lens is mounted. Such a special compensating device is very complicated in its construction and is required to be very accurate. Further, such a compensating device may give an erroneous measurement, if the position of the diaphragm regulating ring of the lens is not proper relative to the camera body when the lens is mounted on the camera. And, further, for use with such a compensating device, all of the interchangeable lenses must rotate the diaphragm regulating ring thereof through the same angle for corresponding F-values of the diaphragm opening. This is an extremely difficult restriction in designing the construction of the lens barrel of each lens. Therefore, the above compensating device can only be employed in a camera of very high price, and is not suitable for use with a camera of relatively low price which is produced by mass production.

The present invention resolves the above described disadvantages of the prior art in an extremely simple way.

SUMMARY OF THE INVENTION

Therefore, a primary object of the present invention is to provide a device for determining and setting the proper exposure on a camera for use with several interchangeable objective lenses selectively mounted on the camera.

Another object of the present invention is to provide a device for determining and setting the proper exposure on a camera having several interchangeable objective lenses selectively mountable on the camera and an exposure meter built into the camera for indicating the intensity of the light passing through the interchangeable lens selectively mounted on the camera without requiring any mechanical coupling between the exposure meter and the interchangeable lens mounted on the camera.

A further object of the present invention is, as set forth hereinafter, to provide a device of compensating for the difference in light intensity due to the difference in focal length of the interchangeable lenses selectively mounted on the camera in the first mentioned device.

A still further object of the present invention is, also as set forth hereinafter, to provide a device of compensating for the influence on the light intensity in the peripheral zone of the lens of the bundle of light rays transmitted through the interchangeable lenses selectively mounted on the camera in the first mentioned device.

The object of the present invention is achieved in accordance with the present invention by providing the same series of reference symbols on the diaphragm regulating ring of each of the interchangeable objective lenses adapted to be selectively mounted on a camera having an exposure meter built therein regardless of the difference in the characteristics of the lenses with the respective succeeding symbol indicating the diaphragm opening as being half the diaphragm opening indicated by the preceding symbol beginning at the maximum diaphragm opening of each of the lenses. The exposure meter is adapted to receive the light passing through the lens mounted on the camera and bears also the same series of reference symbols as those on the diaphragm regulating ring of each of the lenses and located in such a manner that the respective succeeding symbol indicates the intensity of light as being twice as great as that indicated by the preceding symbol and also that, when one of the lenses is mounted on the camera with its diaphragm fully opened, the proper exposure is set on the camera by adjusting the diaphragm of the lens mounted on the camera so as to correspond to the symbol on the exposure meter by which the intensity of the light received by the exposure meter through the lens with its diaphragm fully opened is indicated.

By the provision of the same series of the reference symbols on the diaphragm regulating ring of each of the lenses as described above, the proper exposure can be set in the same manner as described above when any of the lenses other than the above described lenses is mounted on the camera and the intensity of the light passing through the lens with its diaphragm fully opened is measured by the exposure meter.

In accordance with the further features of the present invention, a preset diaphragm regulating ring may be utilized and also the deviation of the diaphragm opening from the theoretical value due to the difference in the focal length of the lens and the deviation of the light intensity in the peripheral zone caused by mechanical elements in the lens may be compensated for by merely displacing appropriately the positions of the respective symbols on the diaphragm regulating ring from the theoretical positions.

BRIEF DESCRIPTION OF THE DRAWINGS

FIG. 4 is a diagram showing the shifted location of reference symbols relative to the theoretical location of each F-value on a diaphragm regulating ring of an interchangeable objective lens incorporating an alternative embodiment of the present invention; and FIG. 5 is a diagram showing the shifted location of the reference symbols relative to the theoretical location of each F-value on a diaphragm regulating ring incorporating a further alternative embodiment of the present invention.

DETAILED DESCRIPTION OF THE PREFERRED EMBODIMENTS

The factors involved in setting the proper exposure for a camera are the shutter speed, sensitivity of the photosensitive material, density of the filter attached to the lens and the diaphragm opening of the lens. For a camera in which the shutter speed is fixed, there has heretofore been provided means for collectively compensating for variations in the indication of the pointer of the exposure meter due to the above factors other than the lens aperture. Therefore, in describing the present invention, the assumption is made that all the above factors other than the diaphragm opening need not be compensated for, or are already compensated for by suitable compensating means well known in the art, and only the lens aperture, i.e. the diaphragm opening of the lens used with the camera is to be regulated for effecting the proper exposure.

Assume that four interchangeable lenses I, II, III and Iv are provided for a camera in which the proper exposure condition is determined by measuring the light intensity transmitted through the interchangeable lens selectively mounted on the camera. The diaphragm regulating ring of each of the lenses can have marked thereon a series of F-values of diaphragm openings such as F2, 2.8, 4 - - - - as indicated on the underside of each of the lines I, II, III and IV in FIG. 1. That is, lens I is provided with a series of F-values F2, F2.8, F4, F5.6, F8, F11, F16, and lens II is provided with a series of F-values F2.8, F4, F5.6, F8, F11, F16, F22, and so on. The present description is of lenses I, II and III, and a description of lens IV will be given later. Any one of these lenses can be referred to as a standard lens; however, it is assumed here that lens I is the standard lens. In this standard lens I, as is well known, a series of lens apertures are defined in such a manner that the lens aperture, i.e. the area of diaphragm opening is reduced to substantially one-half its former value each time the diaphragm regulating ring is adjusted one stop for reducing the aperture, the series of lens apertures being defined as F2, F2.8, F4, F5.6, F8, F11 and F16. It is noted that the F-value for the maximum lens apertures F2.8, F4 of each of the other lenses II and III is the same as one of the intermediate F-values of the series of F-values for lens I, respectively.

Figure 1:
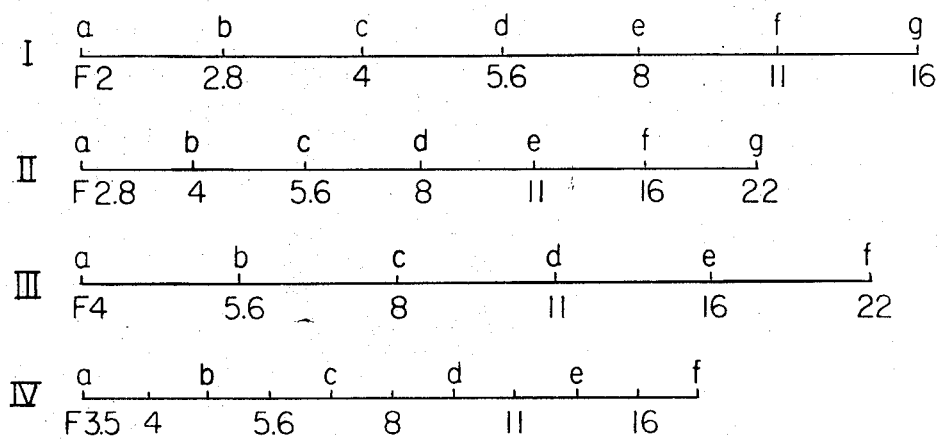
FIG. 1 is a diagram illustrating the principle of the device of the present invention.

In accordance with the present invention, the interchangeable lenses I, II and III have on their diaphragm regulating rings 4 a series of reference symbols such as $a, b, c, d, e$ -----, respectively, in successive locations corresponding to F-values as illustrated in FIG. 1, instead of F-values. Such symbols $a, b, c$, -- -- can be any figures such as 1, 2, 3, 4 ---- or A, B, C, D, E, -----, etc. In the Following description, however, $a, b, c, d$,--- are employed as reference symbols. Reference index 5 (FIG. 2) is provided on the lens for cooperation with the reference symbols on the diaphragm regulating ring.

Figure 2:
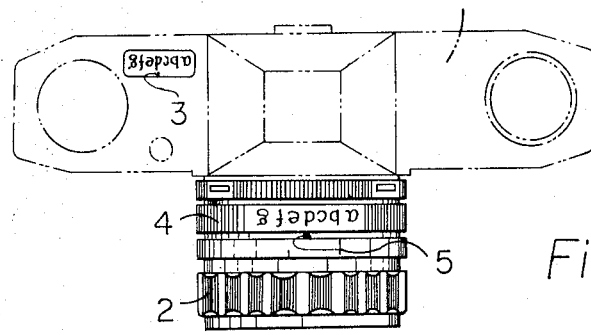
FIG. 2 is a plan view illustrating an embodiment of a camera incorporating the present invention.

Referring to numeral 1 in FIG. 2 designates a camera body in which an exposure meter comprising a photoelectric transducer is incorporated. The exposure meter measures the intensity of the light transmitted through an interchangeable lens 2 selectively mounted on the camera, movable pointer 3 of said meter being swung which is visible from the exterior of the camera body through a window provided in the camera body 1 so as to indicate the measured light intensity. The position of the pointer 3 is read from the scale in the window, said scale having a series of reference symbols $a, b, c, d$, ---- similar to the above described symbols. In accordance with the present invention, these reference symbols are located on the scale with the respective succeeding symbol indicating the light intensity as being twice as great as that indicated by the preceding symbol in such a manner that each of the symbols, when lens 2, the standard lens I, for example, is set in the fully opened condition of the diaphragm opening, indicates a light intensity condition in accordance with which the proper exposure is set on the camera, when diaphragm regulating ring 4 of lens 2 is manually adjusted so that the symbol on the diaphragm regulating ring 4 corresponding to the symbol indicated in the exposure meter is lined up with the reference index 5. That is, when the camera having the standard lens I, for example, attached thereto adjusted to the fully opened condition of the diaphragm opening is directed toward a subject desired to be photographed and the pointer in the exposure meter is swung to the position of reference symbol $a$ in the scale, for example, then this indicates that lens 2 is to be manually set so that reference symbol $a$ on diaphragm regulating ring 4, which reference symbol corresponds to F2, is positioned at stationary reference index 5 on the stationary portion of the lens barrel of lens 2. If the light intensity is increased two times greater than the above condition and the swinging of the pointer 3 is increased so that the pointer 3 points to the reference symbol $b$ on the scale, then this indicates that the proper exposure is F2.8 and, accordingly, diaphragm regulating ring 4 should be manually adjusted so that the symbol $b$ on the diaphragm regulating ring 4 lines up with said stationary index 5. Likewise, if the light intensity is further increased and the pointer 3 points to symbol $c$, then the lens should be adjusted for F4 by rotating ring 4 so that symbol $c$ on ring 4 lines up with index 5. Thus the proper exposure is achieved in the camera.

When lens II or III is mounted on the camera, the proper exposure can also be set in the same manner as described above. The reason why the proper exposure can be set on the camera with lens II or III attached thereto by the same operation as in the case of lens I is described below. As stated above, when pointer 3 points to $c$ with lens I in the fully opened condition F2 of diaphragm opening thereof, this indicates that the proper exposure condition is F4. When lens II in which the fully opened condition of the diaphragm opening is F2.8 is mounted on the camera, then the intensity of light actually transmitted through lens II must be one-half the intensity of light actually transmitted through lens I which is set in the fully opened condition F2 and therefore the amount of the swinging of the pointer 3 is reduced to one-half of that in the case of lens I so that the pointer 3 of the exposure meter will point to symbol $b$ which is one stop less than $c$, thus indicating that, when lens II is used, symbol $b$ on diaphragm regulating ring 4 of lens II, which corresponds to F4, should be lined up with stationary index 5, thereby resulting in the setting of the same diaphragm opening F4 as when using lens I. The same applies when using lens III having a maximum lens aperture F4. That is when lens III is used with the lens aperture set in the fully opened condition F4 of diaphragm opening, pointer 3 will point to symbol $a$, because the light intensity actually transmitted through lens III with the fully opened diaphragm opening is one-fourth of the intensity of the light when using lens I so that the pointer is shifted two stops from $c$ to point to $a$. $a$ indicates that, when using lens III, symbol $a$ on diaphragm regulating ring 4 of lens III must be lined up with index 5 so that aperture F4 is set on the camera.

As stated above, it is readily recognized that, by using reference symbols such as $a, b, c, d$, --- which are used commonly on all the interchangeable lenses according to the limitations as set forth hereinbefore, the proper exposure condition can be manually set conveniently on the camera regardless of the difference in the maximum lens aperture of the interchangeable lens selectively mounted on the camera as well as the difference in the distance between the adjacent two symbols on the diaphragm regulating ring of each of the interchangeable lenses.

Therefore, in accordance with the present invention, it is not necessary to make the distance between the adjacent two symbols on the diaphragm regulating ring of each of the interchangeable lenses different in order to effect the control of the proper exposure.

Figure 3:
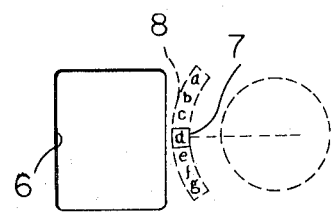
FIG. 3 is a view illustrating the field of view of the viewfinder in a camera embodying the present invention.

The pointer may be located in the upper portion of the camera so that it can easily be seen from the outside of the camera as illustrated in FIG. 2. Alternatively, the pointer can be located in the field of view in the viewfinder as illustrated in FIG. 3. In this case, a small window 7 is provided adjacent to the field of view of the scene in the viewfinder, and one of the symbols a, b, c, --- marked on the arcuate segment 8 fixed to the end of the pointer is read through window 7 as the pointer is swung depending upon the light intensity from the scene.

Now a description of interchangeable lens IV will be given below. The lens IV has a maximum lens aperture of F3.5. This value F3.5 does not correspond to any of the aforementioned series of diaphragm openings, although the remaining diaphragm openings in the series of lens IV other than F3.5 coincide with the aforementioned series.

However, the proper exposure can be set on the camera mounting thereon the lens IV substantially in the same manner as described previously in connection with the lenses II and III, insofar as the same series of symbols a, b, c, d, --- are provided on diaphragm regulating ring 4 in such a manner that a is located so as to correspond to the maximum diaphragm opening, while b is positioned so as to correspond to one-half the above maximum diaphragm opening and c is positioned so as to correspond to one-half the diaphragm indicated by b and so on, regardless of the fact that the position each of the reference symbols except a does not correspond to the position each of the F-values except F3.5.

The reason why the proper exposure can be set on the camera with lens IV having the maximum aperture of F3.5 in the same manner as previously described in connection with the lenses II and III will be set forth below. Under the condition, for example, that the pointer 3 points to a position intermediate the symbols b and c on the scale when using lens I having the maximum diaphragm aperture of F2 with the aperture fully opened, the proper exposure can be obtained by adjusting the diaphragm regulating ring 4 of lens I so that a point intermediate the symbols b and c on the diaphragm regulating ring 4, which position corresponds substantially to the aperture of F3.5 as is clear from FIG. 1, lines up with the index 5. Under such a condition, when lens IV having the maximum diaphragm opening of F3.5 is mounted on the camera with its aperture fully opened, the pointer 3 of the exposure meter will point to the symbol a on the scale in the exposure meter, since the intensity of the light actually passing through lens IV with its diaphragm opening in fully opened condition has been originally reduced so as to correspond to the diaphragm opening of F3.5 thereby reducing the amount of swinging of the pointer 3. Therefore, the proper exposure can be obtained by the lens IV by lining up the symbol a on the diaphragm regulating ring 4 thereof with the index 5. Further, for example, if the pointer 3 points to the symbol c on the scale of the exposure meter, which symbol corresponds to F4, when the lens I is mounted on the camera with its diaphragm opening adjusted in the fully opened condition, thereby indicating that the proper exposure can be effected by adjusting the diaphragm aperture of lens I to F4, then the amount of swinging of the pointer 3 is reduced and the pointer 3 will point to a position intermediate the symbols a and b on the scale when the lens IV is mounted on the camera with its diaphragm opening adjusted in the fully opened condition, because the intensity of the light passing through the lens IV under such conditions has been originally reduced to a value corresponding to F3.5 so that the pointer 3 can be moved only slightly to a position intermediate a and b on the scale of the exposure meter. Therefore, the proper exposure is obtained by the lens IV by lining up a position intermediate the symbols a and b on the diaphragm regulating ring 4 with the index 5, which position corresponds to the diaphragm opening of F4 as is clear from FIG. 1.

Therefore, it is apparent that, in accordance with the characteristic feature of the provision of the reference symbols located in accordance with the present invention on the diaphragm regulating ring of each of the interchangeable lenses and the exposure meter, proper exposure of the film can be set manually without requiring any mechanical coupling between the exposure meter and the interchangeable lens selectively mounted on the camera.

A further feature of the present invention is shown in an alternative embodiment thereof as described below.

As stated above, the intensity of the light transmitted through the objective lens selectively mounted on the camera is measured by a photoelectric transducer located behind the lens. Theoretically, it is desirable to locate a photoelectric transducer, in an exposure meter having the same size as the frame of the film to be exposed in the position where the film is located. However, it is practically impossible to locate the photoelectric transducer in the position where the frame of the film is located, and, in effect, the photoelectric transducer is located in a position somewhat in front of the frame of the film. In case of a single lens reflex camera, the photoelectric transducer is usually located in a position in the optical path of the finder above the focusing mat glass plate. Therefore, the ratio of the light intensity serving to energize the exposure meter for swinging the pointer with respect to the light intensity which is directed to the frame of film for the exposure thereof cannot be kept constant for all the interchangeable lenses having different focal lengths, even though they have the same maximum lens aperture, i.e. the same value of the fully opened diaphragm opening. In particular, in the case of a single lens reflex camera in which the photoelectric transducer is located in a position in the optical path of the finder above the mat glass plate, the light to be measured by the exposure meter passes through the condenser lens which is located adjacent to the mat glass plate, and therefore the resultant focal length effected by the combination of the objective lens and the condenser lens changes when the interchangeable lens is changed. The ratio of the light intensity as referred to above, therefore, varies depending upon the different focal length of the interchangeable lens.

Generally speaking, when the graduation of the scale of the exposure meter is determined by a standard lens which can, as stated previously, be selected at will from the series of the interchangeable lenses, a lens having a greater focal length than that of the standard lens and having the same maximum lens aperture as that of the standard lens effects greater amount of swinging movement of the pointer. For example, a lens having a focal length of 100 mm. effects an increment in the movement of the pointer corresponding to about 1 EV in the exposure meter in comparison with a standard lens having a focal length of 50 mm., although such an increment varies depending upon the location of the photoelectric transducer in the optical path.

In the embodiment of the present invention, the compensation for the variation in the movement of the pointer of the exposure meter due to a different focal length of the interchangeable lenses is effected in the manner as described below. Assume that the pointer indicates a on the scale (this symbol can be any figure as previously stated) when measured by using a standard lens mounted on the camera with its diaphragm fully opened, and the pointer indicates b when measured by using a lens having greater focal length but having the same F-value for the maximum lens aperture as the standard lens with the diaphragm fully opened, then symbol b is marked on the diaphragm regulating ring or the presettable ring therefor at a position aligned with the stationary index, so that b on the ring, when set to be lined up with the index, indicates that the lens is set with the diaphragm fully opened.

Other symbols c,d,e, --- are marked successively at positions on the ring so that they indicate respectively that the light intensity is reduced successively by one stop i.e. by one-half of the light intensity as compared with the preceding stop. Thus the compensation for the error in measuring the light intensity due to difference in focal length of the interchangeable lenses is achieved, thereby enabling the determination and setting of the proper exposure on the camera. FIG. 4 illustrates the marking of symbols a, b, c --- according to the above mentioned procedure.

A further feature of the present invention is that the proper exposure is achieved by compensating for the unevenness or decrease in the light intensity in the peripheral zone of the bundle of light rays passing through a lens due to interference by lens mounting rings built in the objective lens when it is used when open to its relatively greater diaphragm aperture. In effect, when the diaphragm aperture of an objective lens is reduced from the fully opened state by one stop, the light intensity is reduced to one-half that of the fully opened diaphragm in the central region of the bundle of light rays, but the light intensity in the peripheral zone will not decrease to one-half in comparison with the light intensity in peripheral zone of the bundle of light rays when the diaphragm is in the fully opened state, because the interference by the lens mounting rings in the reduced aperture condition remains substantially the same as in the condition of a fully opened diaphragm. Therefore, it is necessary to reduce the aperture of the lens by more than one stop, if the overall light intensity is to be reduced exactly to one-half of the light intensity effected by the fully opened aperture. This tendency is significant in a lens having a maximum lens aperture greater than F2.8. And further, the degree of variation in the light intensity in the peripheral zone of the bundle of light rays differs depending upon the type of the lens. In the camera described above, since the light intensity is measured after it passes through the objective lens, the influence referred to above directly affects the amount of the swinging movement of the pointer of the exposure meter. Therefore, if compensation for the above influence is not made the adjustment of the diaphragm opening, for example, in accordance with the indication of the opening b by the pointer, which opening is other than a, will not always result in an exact reduction of light intensity by one-half in comparison with the light intensity with the opening corresponding to the indication a of the pointer. Therefore, if it is required to reduce the actual lens aperture exactly by one stop, it is necessary to adjust the diaphragm regulating ring more than one stop. This means that, depending upon the inherent characteristics of the lens, the symbols to be marked on the diaphragm regulating ring should be shifted so as to compensate for the above described influence of the interference due to the lens mounting rings.

FIG. 5 shows the location of the symbols such as a, b, c, --- on the diaphragm regulating rings of several interchangeable lenses shifted relative to theoretical location of F-values, respectively, in accordance with actual test data. As stated above, the amount of the deviation of the position of each symbol relative to the theoretical location of F-values varies depending upon the type of the lens, although the maximum lens aperture is the same for the several lenses. Therefore, such a compensation as described above can not be represented by a simple formula. However, the characteristic feature of the present invention that the position each of the symbols on the diaphragm regulating ring is shifted relative to the theoretical position by taking into consideration the influence of variation in the light intensity in the peripheral zone of the bundle of light rays affords better regulation of the exact exposure setting of the camera.

The present invention as described above can be applied not only to a single lens reflex camera but also to any other type of camera insofar as the light passing through the objective lens mounted on the camera is received by the exposure meter built into the camera so as to be measured thereby. When the present invention is applied to a single lens reflex camera, the brightness in the viewfinder is reduced when the diaphragm regulating ring is adjusted by using symbols such as a, b, c, --- directly provided on the diaphragm regulating ring in accordance with the indication of the pointer of the exposure meter, thereby resulting in inconvenience during viewing through the finder. Therefore, it is preferable to provide a presettable diaphragm ring in addition to the diaphragm regulating ring in the objective lens, which is well known in the art, and to mark the above symbols such as a, b, c, --- on said presettable diaphragm ring in accordance with the present invention. Then, the operator can view the bright viewfinder until the moment the shutter is operated, because the adjustment of the presettable diaphragm ring does not actuate the diaphragm regulating ring until the moment the shutter is operated.

Sometimes, the operator may wish to know the actual F-value of the lens aperture which has been set in accordance with the present invention so that he can further readjust the lens aperture at this will depending upon the circumstances. In such a case, actual F-values can be marked on the diaphragm regulating ring or presettable diaphragm ring together with the above described symbols such as a, b, c, ---, as shown in FIG. 1.

I claim:

1. Device for determining and manually setting the proper exposure for a camera having a plurality of selectively interchangeable objective lenses of different characteristics for interchangeable coupling therewith, and having an exposure meter built into said camera with a movable pointer incorporated therein for indicating the intensity of light transmitted through the lens mounted on said camera and received by said meter in cooperation with a scale on said meter having a series of reference symbols thereon; each of said interchangeable objective lenses having a diaphragm regulating ring with a series of reference symbols provided thereon which cooperate with a reference index provided on said objective lens so as to cause the diaphragm opening thereof to be regulated by manually aligning a selected one of said series of reference symbols on said diaphragm regulating ring with said reference index, wherein the improvement comprises each of said interchangeable objective lenses with its diaphragm regulating ring having the same series of reference symbols regardless of the difference in the characteristics of the lenses, and said series of the reference symbols are so located in spaced relationship from each other that the respective succeeding reference symbol indicates that the diaphragm opening is one-half the diaphragm opening indicated by the adjacent preceding reference symbol beginning with and having the maximum diaphragm opening of a selected one of the objective lenses lined up with said reference index; said interchangeable lenses being selectively mounted on the camera free of any mechanical coupling between it and said exposure meter; and the same series of reference symbols as those on the diaphragm regulating ring are correspondingly provided on said exposure meter scale in spaced relationship from each other such that the respective successive symbol indicates the intensity of the light received by said exposure meter as being twice as great as that indicated by the preceding symbol so that proper exposure is set on the camera, said proper exposure being assured when the selected one of the objective lenses is mounted thereon with the diaphragm thereof fully opened, by manually aligning the symbol on the diaphragm regulating ring corresponding to that of the reference symbols on the exposure meter, to which the pointer of the exposure meter is directed, with the reference index on the objective lens.

2. Device according to claim 1 wherein:
 1. the objective lens is provided with a preset diaphragm regulating ring; and
 2. the reference symbols are provided on said preset diaphragm regulating ring in a uniform manner to cause the exposure setting of the camera to be effected under the maximum diaphragm opening so that the maximum brightness of the finder is maintained prior to the exposure of the camera.

3. Device according to claim 1 wherein:

1. the location of each of said reference symbols in said series on each of said interchangeable objective lenses is placed thereon in a position displaced from the theoretical location for each of the settings of the diaphragm opening of the lens to compensate for the difference in focal length of a given lens as compared to the other lenses.

4. Device according to claim 1 wherein the location of each of said reference symbols in said series on each of said interchangeable objective lenses is placed thereon in a position displaced from the theoretical location for each of the settings of the diaphragm opening the lens to compensate for the deviation of light intensity of the bundle of light rays passing through a peripheral zone of the lens from the theoretical light intensity due to interference caused by mechanical elements in the lens.